(12) United States Patent
Ikeno et al.

(10) Patent No.: US 10,081,394 B2
(45) Date of Patent: Sep. 25, 2018

(54) MOUNTING STRUCTURE OF VEHICULAR RESIN COMPONENT

(71) Applicant: TOYOTA SHATAI KABUSHIKI KAISHA, Kariya-shi, Aichi (JP)

(72) Inventors: Katsuya Ikeno, Kariya (JP); Osamu Tamura, Takahama (JP); Nobuyoshi Nishikawa, Obu (JP); Wataru Iwase, Anjo (JP)

(73) Assignee: TOYOTA SHATAI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 14/888,612

(22) PCT Filed: Sep. 26, 2014

(86) PCT No.: PCT/JP2014/075568
§ 371 (c)(1),
(2) Date: Nov. 2, 2015

(87) PCT Pub. No.: WO2015/093121
PCT Pub. Date: Jun. 25, 2015

(65) Prior Publication Data
US 2016/0288842 A1    Oct. 6, 2016

(30) Foreign Application Priority Data
Dec. 17, 2013  (JP) ................. 2013-260656

(51) Int. Cl.
*B60R 13/04* (2006.01)
*B62D 25/16* (2006.01)
*F16B 5/07* (2006.01)

(52) U.S. Cl.
CPC ............ *B62D 25/163* (2013.01); *B60R 13/04* (2013.01); *B62D 25/161* (2013.01); *F16B 5/07* (2013.01)

(58) Field of Classification Search
None
See application file for complete search history.

(56) References Cited

FOREIGN PATENT DOCUMENTS

| CN | 103318104 A | 9/2013 |
|---|---|---|
| JP | 34-19633 Y1 * | 12/1959 |
| JP | S34-19633 Y | 12/1959 |
| JP | S61-176013 U | 11/1986 |
| JP | 10244968 A * | 9/1998 |

(Continued)

*Primary Examiner* — John Walters
*Assistant Examiner* — Hilary L Johns
(74) *Attorney, Agent, or Firm* — Oliff PLC

(57) ABSTRACT

A mounting structure for a vehicular resin component provided with a panel body having a design surface on a surface of the panel body; a reinforcement rib arranged upright on a back surface of the panel body; and a mounting member for a vehicle. The reinforcement rib includes a proximal end portion connected to the panel body and formed with a thickness thinner than a thickness of a distal end portion. The distal end portion of the reinforcement rib includes an inclined surface formed between the distal end portion and the proximal end portion with increasing thickness toward the leading end side, and is provided with a locking hole with a hole direction inclined in the direction of inclination of the inclined surface. In the mounting member, a locking claw capable of being fitted in the locking hole is formed.

2 Claims, 8 Drawing Sheets

(56) References Cited

FOREIGN PATENT DOCUMENTS

| | | | | |
|---|---|---|---|---|
| JP | H10-244968 | A | | 9/1998 |
| JP | 2000-016342 | A | | 1/2000 |
| JP | 2013240999 | A | * | 12/2003 |
| JP | 2004-276796 | A | | 10/2004 |
| JP | 2004276796 | A | * | 10/2004 |
| JP | 2007-186093 | A | | 7/2007 |
| JP | 2011-020490 | A | | 2/2011 |
| JP | 2013-240999 | A | | 12/2013 |
| WO | 2014/112312 | A | | 7/2014 |

* cited by examiner

MOUNTING STRUCTURE OF VEHICULAR RESIN COMPONENT

CROSS-REFERENCE TO RELATED APPLICATIONS

This is a US national phase application based on the PCT International Patent Application No. PCT/JP2014/075568 filed on Sep. 26, 2014, and claiming the priority of Japanese Patent Application No. 2013-260656, filed on Dec. 17, 2013, the entire contents of which are herewith incorporated by reference.

TECHNICAL FIELD

The present invention relates to a mounting structure by which a vehicular resin component is mounted to a vehicle.

BACKGROUND ART

Heretofore, there is a case that a door, a body exterior panel, and others of an automobile are mounted with a vehicular resin component such as a side mudguard for enhancing design quality and functionality. The vehicular resin component is, generally, an injection-molded component formed by injection molding. Therefore, in most cases, a mounting seat for mounting the vehicular resin component to the door, the body exterior panel, and others of the automobile is integrally formed with the vehicular resin component in injection molding. As a structure of mounting the vehicular resin component to the door, the body exterior panel, and others, it has been generally known a clip engagement structure in which a clip is fitted in a mounting seat of the vehicular resin component and a locking hole is formed in the door, the body exterior panel, and others and the clip is engaged in the locking hole (see Patent Document 1, for example).

RELATED ART DOCUMENTS

Patent Documents

Patent Document 1: JP-A-2007-186093

SUMMARY OF INVENTION

Problems to be Solved by the Invention

However, the above clip engagement structure is in need of forming a clip locking hole in a predetermined position of a door, a body exterior panel, or the like, and a clip mounting seat has to be formed on a back surface of the vehicular resin component. Therefore, in the clip engagement structure, sink marks, a welding line, and others are likely to be generated in forming a clip mounting seat on a front surface (design surface) of the vehicular resin component, leading to defects in quality of an outer appearance surface. Further, an injection molding die requires a slide molding die structure for forming the clip mounting seat, so that a die structure becomes complicated and a die cost is increased.

The present invention has been made in view of the circumstances to solve the above problems and has a purpose to provide a mounting structure of a vehicular resin component which can be formed by a simple die structure without causing any defects in quality of an outer appearance surface such as sink marks on a front surface (design surface) of the vehicular resin component.

Means of Solving the Problems (1) To achieve the above purpose, one aspect of the invention provides a mounting structure of a vehicular resin component including: a panel body provided with a front surface having a design surface; a reinforcement rib arranged standing upright on a back surface of the panel body; and a mounting member for a vehicle, wherein the reinforcement rib has a proximal end portion connected to the panel body, the proximal end portion having a thin thickness thinner than a thickness of a leading end portion of the rib, the leading end portion includes an inclined surface formed between the proximal end portion and the leading end portion so that the thickness of the leading end portion increases toward a leading end side, and the leading end portion is provided with a locking hole slantingly formed in an inclined direction of the inclined surface, and the mounting member is provided with a locking claw engageable in the locking hole, the locking claw is engaged with the locking hole so that the mounting member is fixed to the back surface of the panel body, and the mounting member is fixed to the vehicle.

Herein, "an inclined direction of the inclined surface" indicates a direction in which the inclined surface is inclined with respect to a standing direction of the reinforcement rib which is arranged standing upright on the back surface of the panel body. An interior angle formed by the standing direction of the reinforcement rib and the inclined direction of the inclined surface and an interior angle formed by the standing direction of the reinforcement rib and a hole extending direction of the locking hole are each preferably within a range of 10 to 80 degrees, more preferably within a range of 30 to 60 degrees, further preferably within a range of 40 to 50 degrees. This is because, for demolding of a product, the leading end portion of the reinforcement rib is easy to tilt along the inclined surface, thus enabling easy demolding of the locking hole. Further, it is preferable that the reinforcement rib linearly extends with a predetermined height with respect to the panel body and has open ends in section in a longitudinal direction. This is intended to allow molten resin to easily flow from the end portion in the longitudinal direction to the leading end portion in injection molding, thereby enabling the resin to flow from the leading end portion toward the proximal end portion, so that sink marks and others on the proximal end portion can be reduced. Further, it is preferable to fix the mounting member to the vehicle by use of an adhesive sheet (for example, a double-faced adhesive sheet). Using the adhesive sheet can eliminate the need to form a mounting hole in a vehicle, and therefore the resin component can be easily mounted or attached to the vehicle anywhere other than in a factory.

(2) In the mounting structure for the vehicular resin component described in the above (1), preferably, the mounting member has an end portion opposite the locking claw, the end portion being connected to an outer peripheral edge of the panel body with an integral hinge.

(3) In the mounting structure for the vehicular resin component described in the above (1) or (2), preferably, the locking claw is provided on a tip side with a plate-shaped tab portion insertable through the locking hole and provided on a proximal end side with a claw portion engageable with the locking hole.

Effects of the Invention

According to the present invention, a mounting structure of a vehicular resin component formed by a simple die structure can be provided without causing defects in quality of an outer appearance surface, such as sink marks and others, on a front surface (design surface) of the vehicular resin component.

MODE FOR CARRYING OUT THE INVENTION

A detailed description of a first and second embodiments of a mounting structure by which a vehicular resin component is mounted to a vehicle embodying the present invention will now be given referring to the accompanying drawings.

First Embodiment

Figure 1:
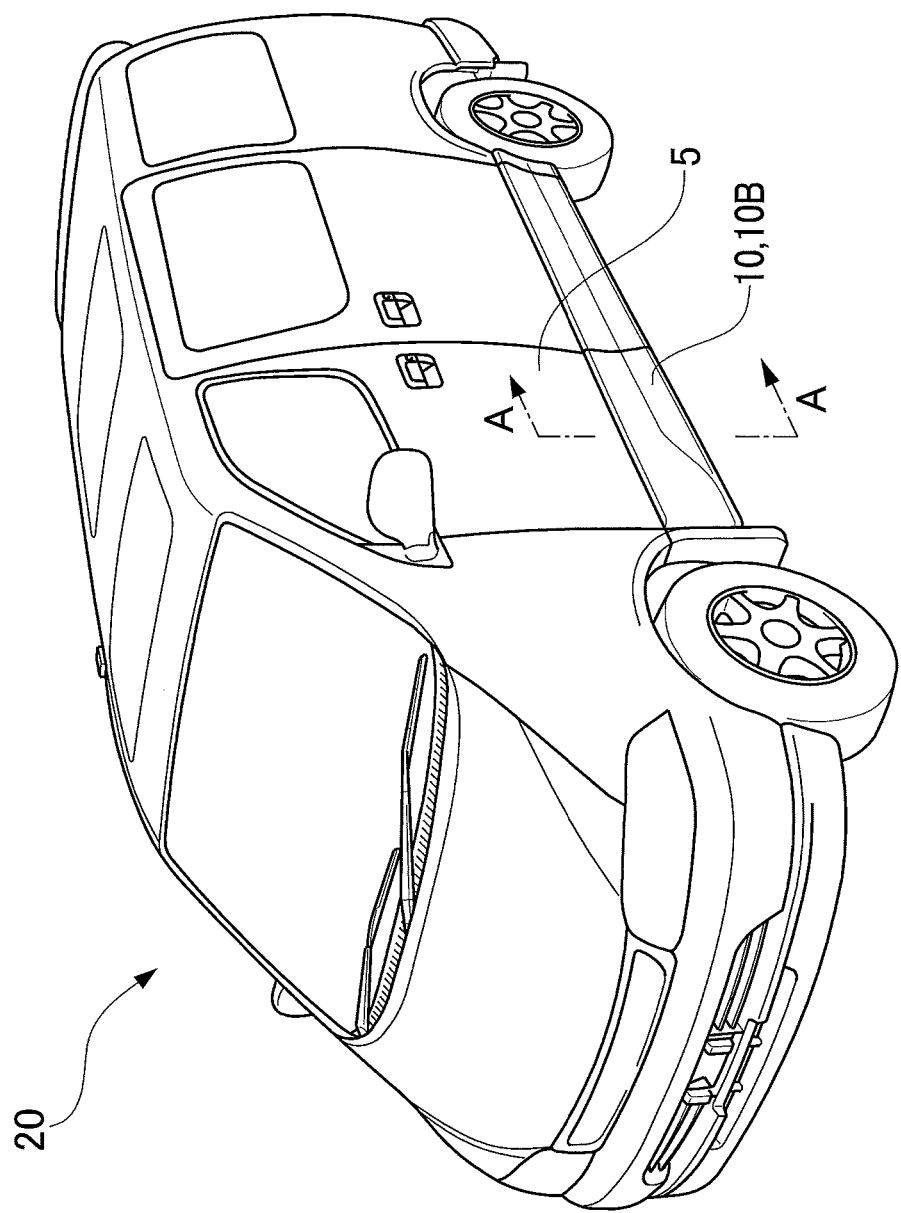
FIG. 1 is a perspective view of a vehicle (door panel) to which a vehicular resin component (side mudguard) is mounted in embodiments of the present invention.
Figure 2:
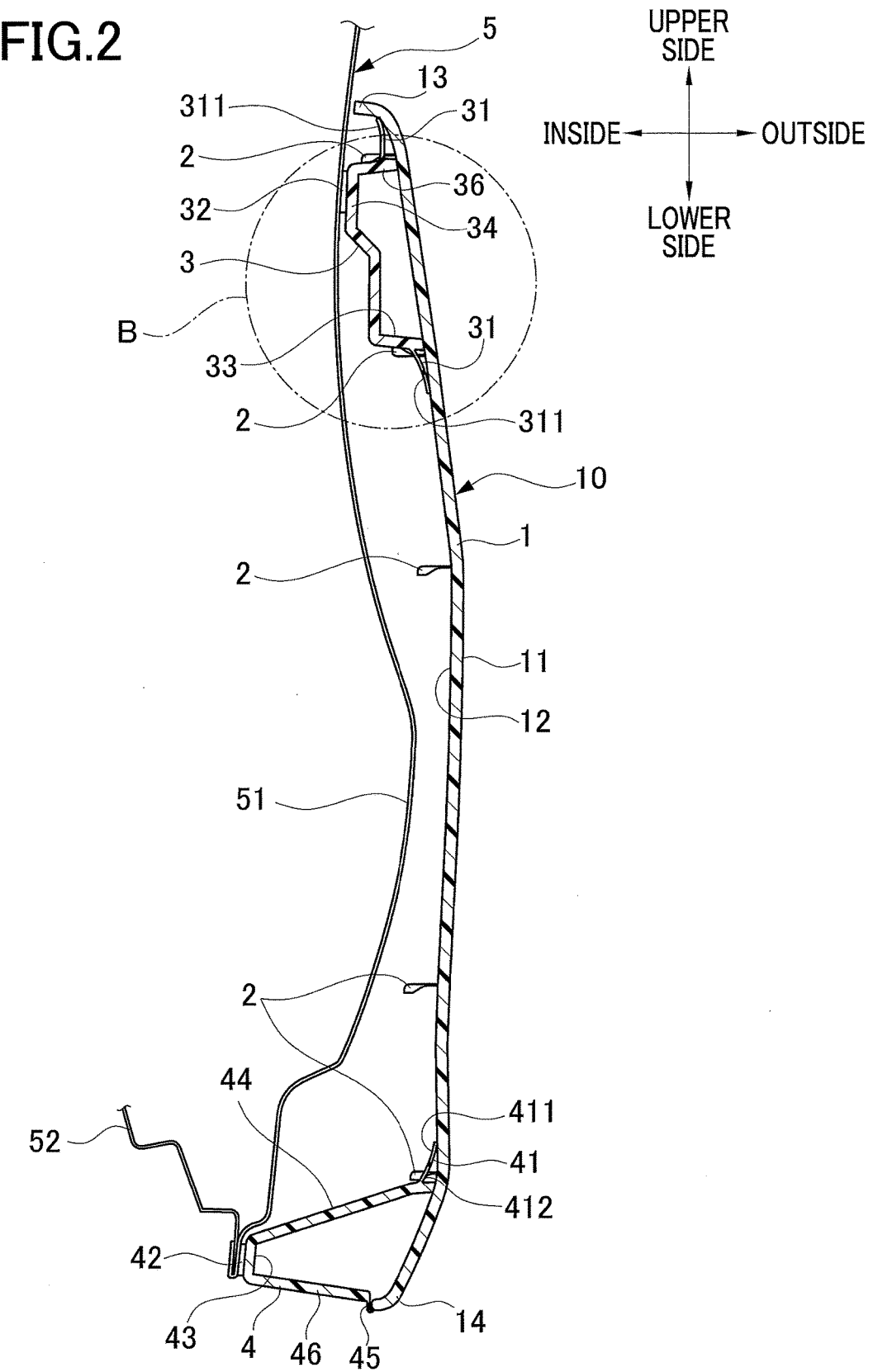
FIG. 2 is a sectional view taken along a line A-A in FIG. 1, showing a mounting structure of the vehicular resin component (side mudguard) in a first embodiment.
Figure 3:
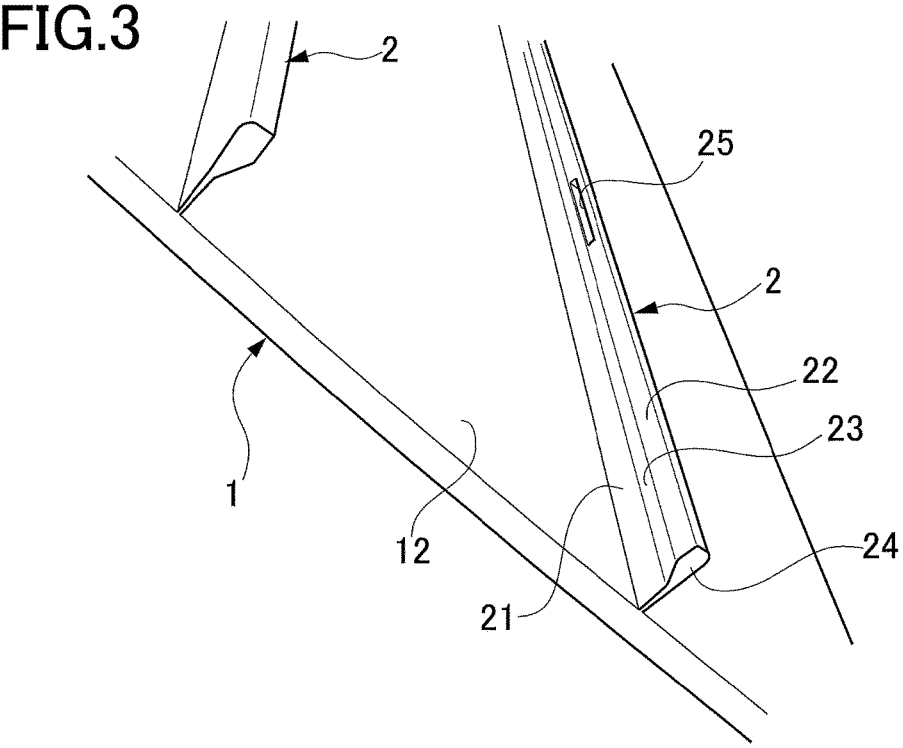
FIG. 3 is a partial perspective view of a panel body and a reinforcement rib shown in FIG. 2.
Figure 4:
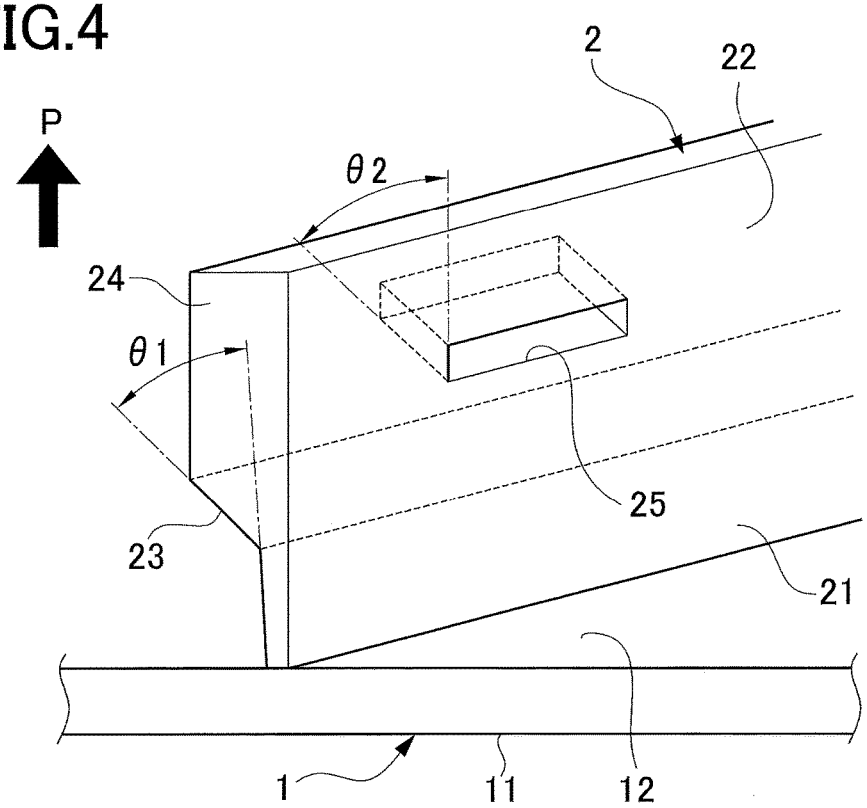
FIG. 4 is a detailed perspective view of a locking hole formed in the reinforcement rib shown in FIG. 2.
Figure 5:
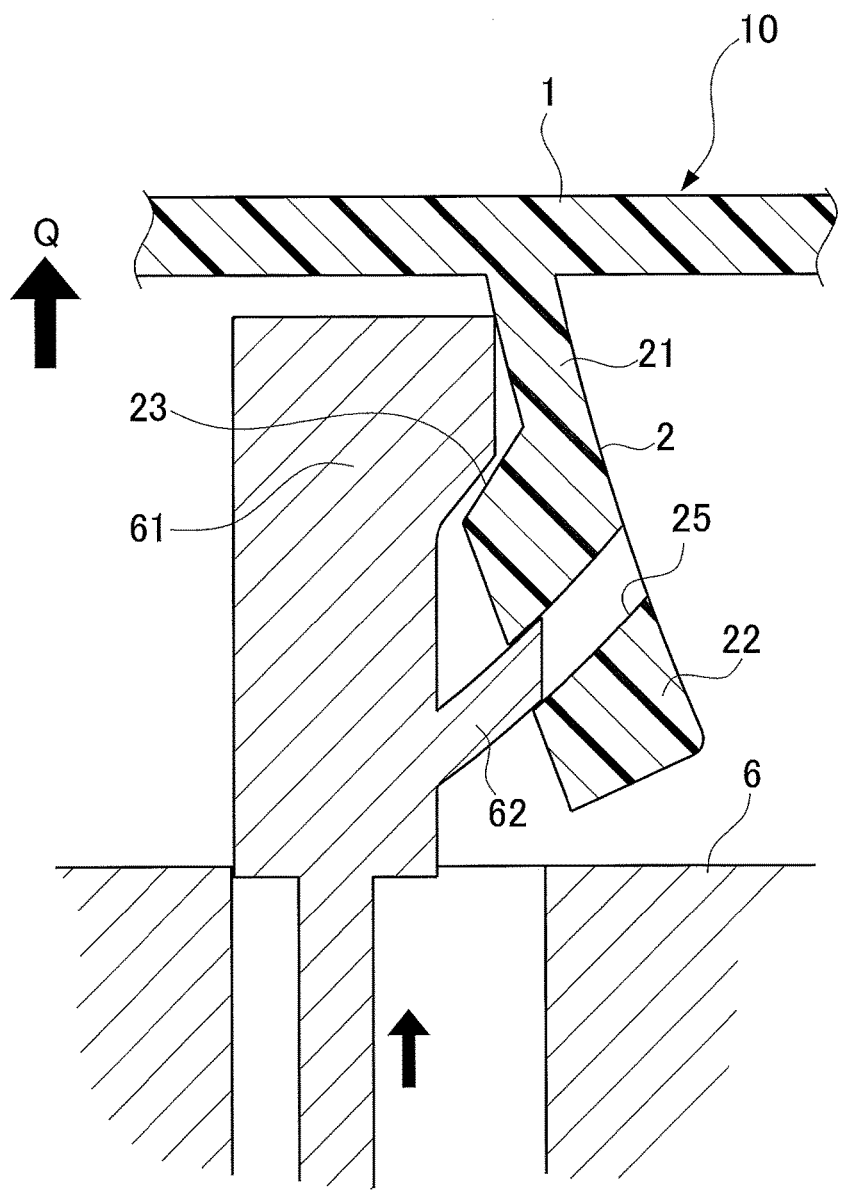
FIG. 5 is a schematic sectional view in which the vehicular resin component shown in FIG. 2 is being separated from a movable die.
Figure 6:
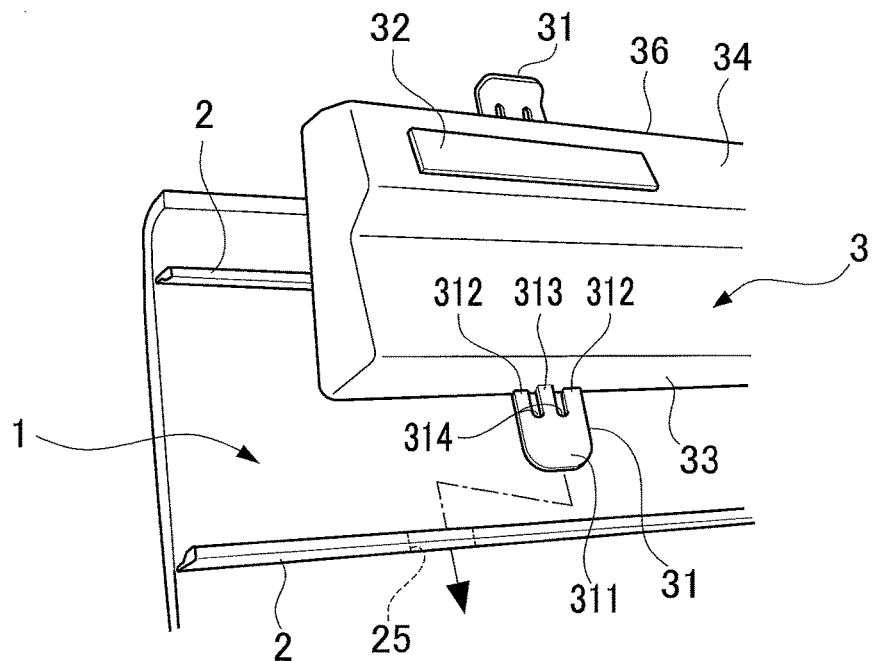
FIG. 6 is a perspective view for explaining a structure before an upper mounting member shown in FIG. 2 is engaged with the reinforcement rib.
Figure 7:
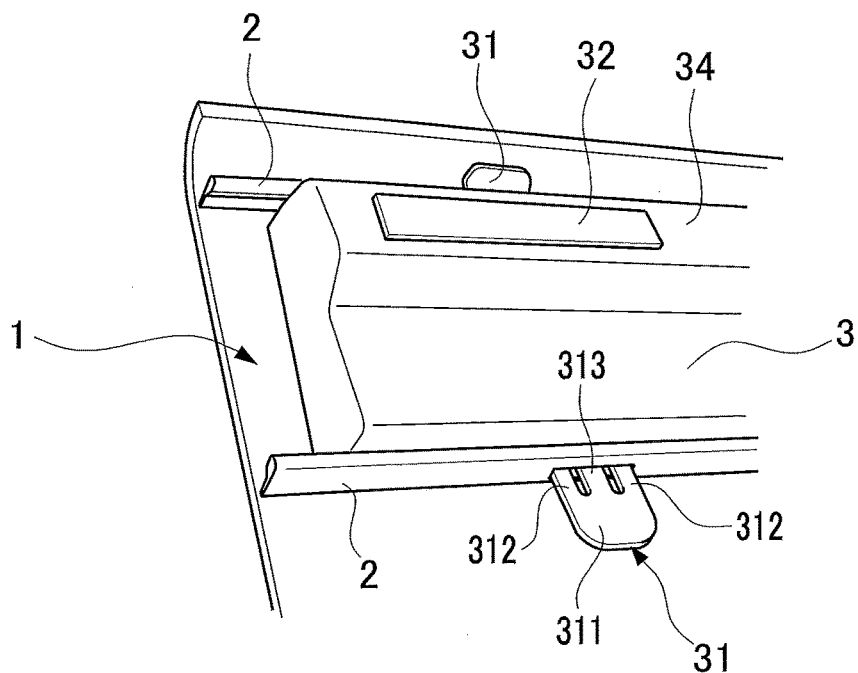
FIG. 7 is a perspective view for explaining a structure after the upper mounting member shown in FIG. 2 is engaged with the reinforcement rib.
Figure 8:
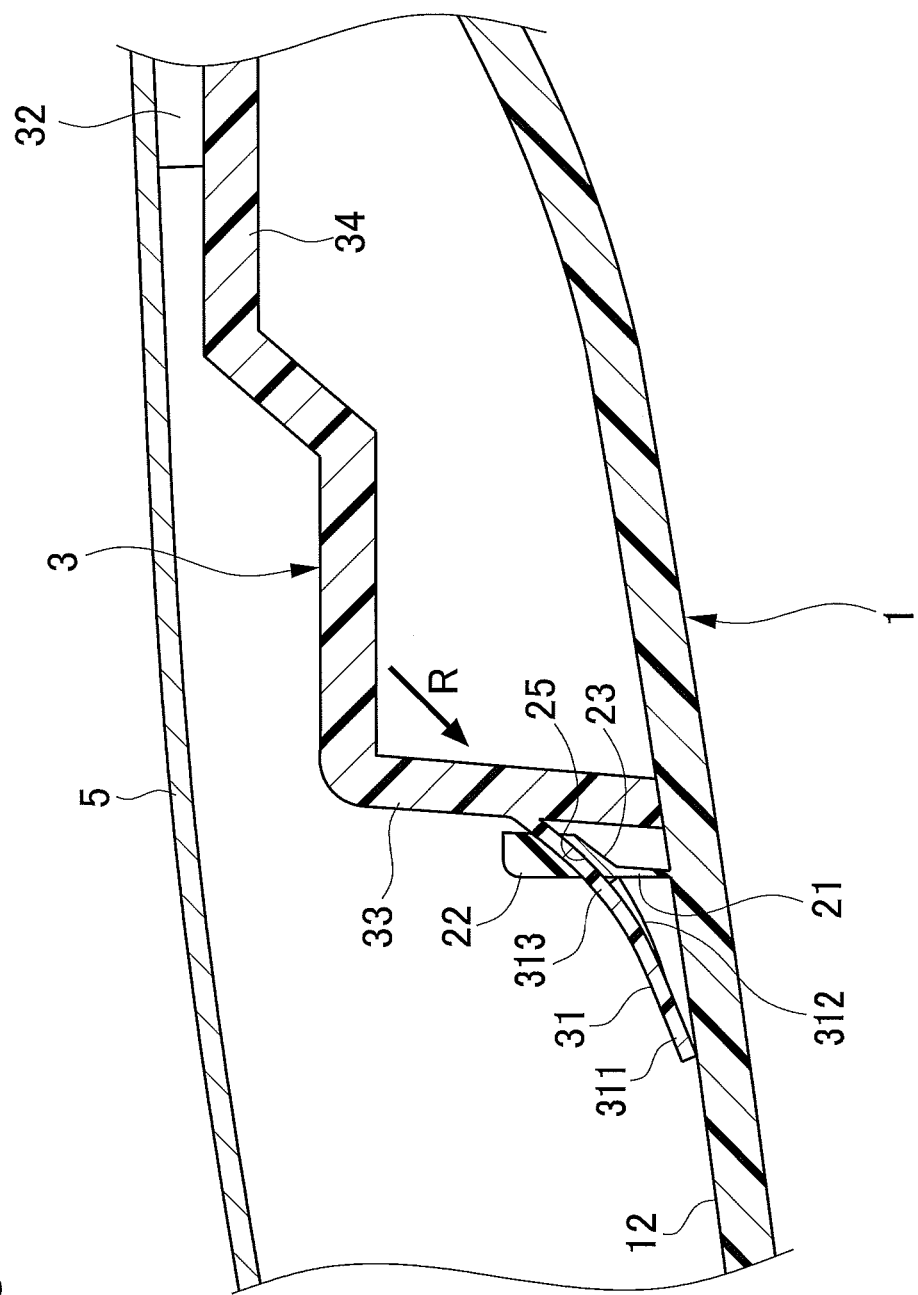
FIG. 8 is a detailed sectional view of a part B shown in FIG. 2.

First, a first embodiment of a mounting structure of a vehicular resin component according to the present invention is now explained in detail with an example of a side mudguard attached to a door panel with reference to FIGS. 1 to 9. FIG. 1 is a perspective view showing a state in which a vehicular resin component (side mudguard) embodying the present invention is mounted on a vehicle (door panel). FIG. 2 is a sectional view taken along a line A-A in FIG. 1, showing the first embodiment of a mounting structure of the vehicular resin component (side mudguard). FIG. 3 is a partial perspective view of a panel body and a reinforcement rib shown in FIG. 2. FIG. 4 is a detailed perspective view of a locking hole formed in the reinforcement rib shown in FIG. 2. FIG. 5 is a schematic sectional view in which the vehicular resin component shown in FIG. 2 is being taken out from a movable die. FIG. 6 is a perspective view for explaining a structure before an upper mounting member shown in FIG. 2 is engaged with the reinforcement rib. FIG. 7 is a perspective view for explaining a structure after the upper mounting member shown in FIG. 2 is engaged with the reinforcement rib. FIG. 8 is a detailed sectional view of a part B shown in FIG. 2.

As shown in FIG. 1, a side mudguard 10 is attached to a side surface of a door panel 5, which is free to be opened and closed, mounted in a side face opening portion of a vehicle 20. The side mudguard 10 is an almost rectangular exterior resin component extending in a vehicle upper and lower direction and in a vehicle front and rear direction. The side mudguard 10 is demanded not only for a mudguard function in running but also for a high design property as one of aero parts. Therefore, the side mudguard 10 is requested to have high quality on an outer appearance surface as high as the door panel 5.

As shown in FIG. 2, the door panel 5 is configured with a door inner panel 52 placed in a vehicle interior side and a door outer panel 51 placed in a vehicle exterior side. The side mudguard 10 is attached to an outer surface (outer side) of the door outer panel 51. The side mudguard 10 is provided with a panel body 1 covering the door outer panel 51, reinforcement ribs 2 arranged standing upright on a back surface 12 of the panel body 1, and mounting members 3 and 4 for attaching the side mudguard 10 to the door outer panel 51. The panel body 1 has an almost uniform thickness from an upper outer peripheral edge 13 to a lower outer peripheral edge 14 and provides a design surface focused on a designing appearance.

As shown in FIGS. 2 and 3, the reinforcement ribs 2 are arranged standing upright with an almost uniform height from the rear surface 12 of the panel body 1 toward a vehicle interior side for ensuring rigidity of the panel body 1. Further, each of the reinforcement ribs 2 is arranged to linearly extend in the vehicle front and rear direction, and a plurality of the reinforcement ribs 2 are arranged at arbitrary intervals in the upper and lower direction between the upper outer peripheral edge 13 and the lower outer peripheral edge 14 of the panel body 1. On each of longitudinal end portions 24 of the reinforcement rib 2, a sectional face is open.

Each reinforcement rib 2 is configured such that a proximal end portion 21 connected to the panel body 1 has a thickness thinner than that of a leading end portion 22. Further, one side wall surface of the reinforcement rib 2 is formed of flush surfaces of the proximal end portion 21 and the leading end portion 22, and the other side wall surface of the reinforcement rib 2 includes an inclined surface 23 providing a thickness gradually increasing from an end of the proximal end portion 21 toward a leading end side, and the inclined surface 23 constitutes a step surface connecting a flat surface of the proximal end portion 21 and a flat surface of the leading end portion 22. The inclined surface 23 constitutes a negative angle portion in injection molding.

As shown in FIG. 4, the leading end portion 22 of the reinforcement rib 2 is provided with a locking hole 25 slantingly formed therethrough such that a hole forming direction is inclined in an almost same direction with an inclined direction of the inclined surface 23. The "almost same direction" means that even if the inclined direction of the inclined surface 23 and the hole forming direction of the locking hole 25 are different from each other by at least about 5 to 10 degrees, this difference is within an allowable range. In the present embodiment, an interior angle θ1 formed by a standing direction (a direction indicated with an arrow P) of the reinforcement rib 2 and the inclined direction of the inclined surface 23 is made equal to an interior angle θ2 formed by the standing direction (the direction indicated with the arrow P) of the reinforcement rib 2 and the hole forming direction of the locking hole 25. The interior angle θ1 and the interior angle θ2 are each formed to be about 40 to 50 degrees. The locking hole 25 penetrates through the leading end portion 22, opening at both side wall surfaces, and hence the thus formed hole has an almost parallelogram cross-section. Each opening of the locking hole 25 is formed of a rectangular shape having a long side in a longitudinal direction of the reinforcement rib 2.

As shown in FIG. 5, in a movable die 6 for forming the side mudguard 10, a negative angle shaping portion 61 for forming the inclined surface 23 of the reinforcement rib 2 and a locking hole shaping portion 62 for forming the locking hole 25 are integrally connected and provided to be movable in a die-removing direction (a direction indicated with an arrow Q). The die-removing direction (direction indicated with the arrow Q) is same as the direction in which the reinforcement rib 2 is arranged standing upright. Therefore, when the side mudguard 10 is taken out upwardly from the movable die 6 after molding, the inclined surface 23 of the reinforcement rib 2 moves upward along the negative angle shaping portion 61, thereby making the leading end portion 22 of the reinforcement rib tilt in a direction of separating from the negative angle shaping portion 61. At this time, the locking hole 25 can also be separated from the locking hole shaping portion 62. As a result, the movable die 6 does not need to include a complicated die structure such as a slide molding die for the locking hole, and the locking hole 25 can be formed by a simple die structure.

As shown in FIGS. 2, 6, and 7, on a back surface side of the panel body 1, the mounting members 3 and 4 are respectively fixed at a position adjacent to the upper outer peripheral edge 13 and a position adjacent to the lower outer peripheral edge 14. The upper mounting member 3 is provided with a seat portion 34 formed along a side surface of the door outer panel 51 and with an upper end portion 36 and a lower end portion 33 which are in contact with the back surface of the panel body 1. The upper end portion 36 is provided with a plate-shaped locking claw 31 protruding upward, and the lower end portion 33 is provided with another plate-shaped locking claw 31 protruding downward. Both the locking claws 31 have flexibility allowing flexing or bending in a plate thickness direction. Further, each of the locking claws 31 is provided on a tip end side with a plate-shaped tab portion 311 which can pass through the locking hole 25 and on a proximal end side with claw portions 312 to be engaged with the locking hole 25. The claw portions 312 are separated from cutout grooves 314 from a connecting portion 313 which connects the upper end portion 36 or the lower end portion 33 with the plate-shaped tab portion 311.

Therefore, the tip side of the locking claw 31 is inserted in the locking hole 25, and subsequently the plate-shaped tab portion 311 is pinched to pull the locking claw 31 through the locking hole 25 so that the claw portion 312 formed on the proximal end side is engaged with the locking hole 25.

To be specific, as shown in FIG. 8, when the locking claw 31 is slantingly inserted into the locking hole 25 of the leading end portion 22 of the reinforcement rib 2 in an almost same direction (a direction indicated with an arrow R) with the inclined surface 23, the plate-shaped tab portion 311 protrudes out from an opposite side of the locking hole 25. Accordingly, the plate-shaped tab portion 311 can be picked up and raised to a horizontal position and the locking claw 31 can be pulled through the locking hole 25 so that the claw portions 312 formed on the proximal end side are engaged with the locking hole 25. The plate-shaped tab portion 311 is curved and brought into contact with the back surface 12 of the panel body 1. When the plate-shaped tab portion 311 is curved, the claw portions 312 gets hardly displaced and disengaged from the locking hole 25.

As a result, the mounting member 3 is pulled toward the direction indicated with the arrow R via the locking claw 31, and the upper end portion 36 and the lower end portion 33 are each brought into contact with the back surface 12 of the panel body 1, so that the mounting member 3 is fixed to the back surface 12 of the panel body 1.

Further, as shown in FIG. 2, the lower mounting member 4 includes a seat portion 43 formed along a flange-shaped lower end of the door outer panel 51, an upper end portion 44 contacted with the back surface of the panel body 1, and a lower end portion 46 connected to the lower outer peripheral edge 14 of the panel body 1 via an integral hinge 45. The upper end portion 44 is provided with a plate-shaped locking claw 41 protruding upward. The locking claw 41 has the similar structure to the locking claw 31 of the above mentioned mounting member 3.

Therefore, a tip side of the locking claw 41 is inserted in the locking hole 25, and the plate-shaped tab portion 411 can be picked up and the locking claw 41 can be pulled through the locking hole 25 so that a claw portion 412 formed on a proximal end side are engaged with the locking hole 25. As a result, the lower mounting member 4 is fixed to the back surface 12 of the panel body 1 via the locking claw 41 and the integral hinge 45.

Further, as shown in FIGS. 2 and 6 to 8, the mounting members 3 and 4 are bonded to the door outer panel 51 by adhesive sheets 32 and 42. The adhesive sheets 32 and 42 are rectangular double-faced adhesive sheets.

Figure 9:
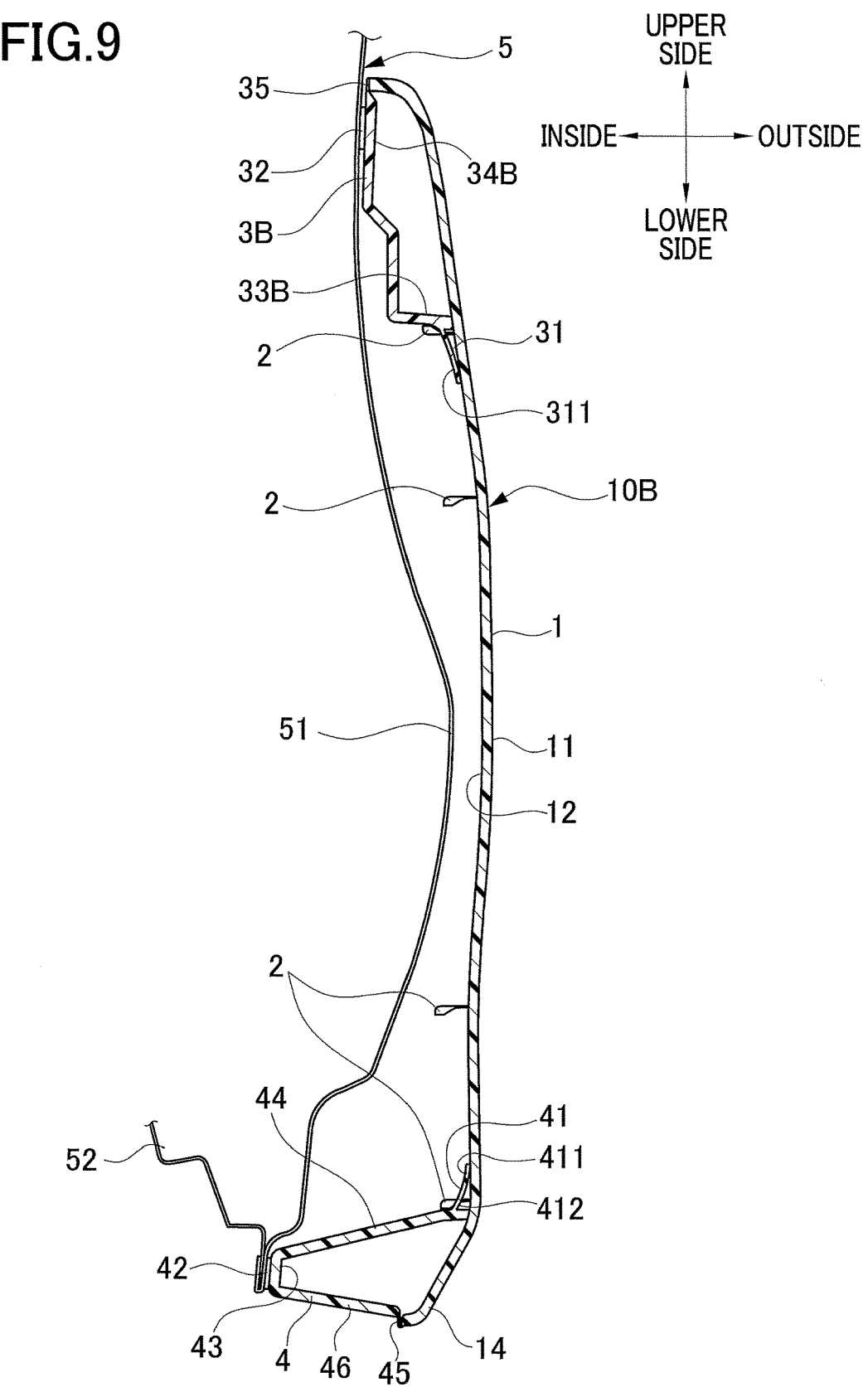
FIG. 9 is a sectional view taken along a line A-A in FIG. 1, showing a mounting structure of a vehicular resin component (side mudguard) in a second embodiment.
Figure 10:
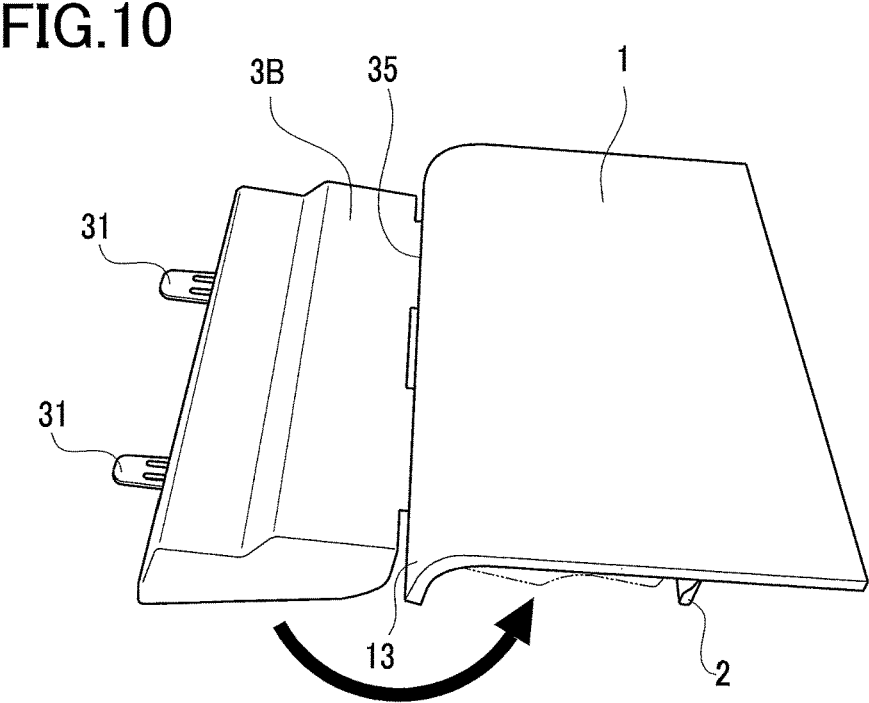
FIG. 10 is a perspective view of an upper mounting member shown in FIG. 9 in a reversed position via an integral hinge.
Figure 11:
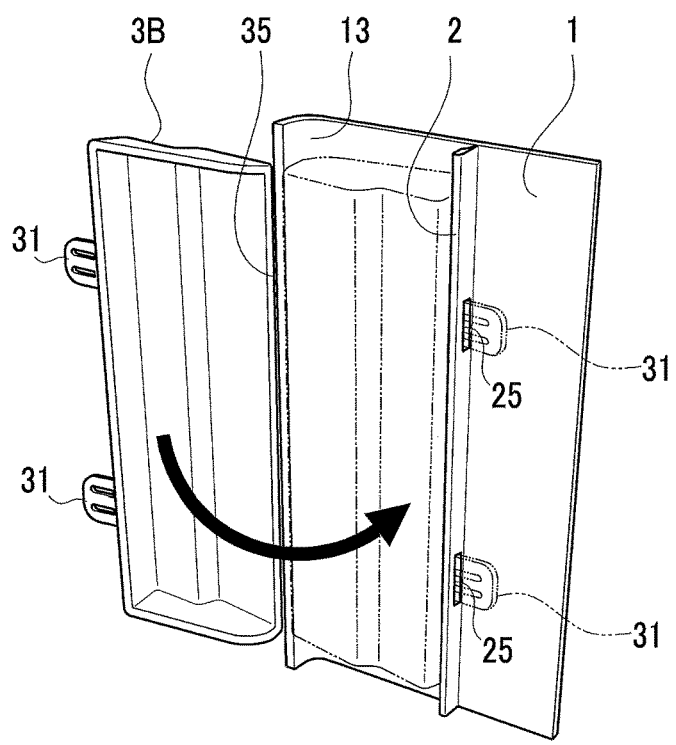
FIG. 11 is a perspective view for explaining a structure before and after the upper mounting member shown in FIG. 9 is engaged with the reinforcement rib.

A specific mounting method is described as follows. Namely, the seat portions 34 and 43 of the mounting members 3 and 4 have respectively been stuck with the adhesive sheets 32 and 42 in advance. The mounting members 3 and 4 stuck with the adhesive sheets 32 and 42 are fixed to the back surface 12 of the panel body 1 by the locking claws 31 and 41. It is preferable that predetermined portions of the door outer panel 51 to which the adhesive sheets 32 and 42 are to be stuck are subjected in advance to a primer treatment using thinner or the like. The side mudguard 10 fixed with the mounting members 3 and 4 is placed in contact with and in position on the door outer panel 51 and kept for a predetermined period of time so that the adhesive sheets 32 and 42 are completely stuck. Thus, the side mudguard 10 is fixed to the door panel 5 via the adhesive sheets 32 and 42, Second Embodiment Next, a mounting structure of a vehicular resin component in a second embodiment of the present invention is explained in detail with an example of a side mudguard 10B fixed to the door panel 5 referring to FIGS. 9 to 11. FIG. 9 is a sectional view taken along a line A-A in FIG. 1, showing a mounting structure of a vehicular resin component (side mudguard) in the second embodiment. FIG. 10 is a perspective view showing an upper mounting member which is placed in a reversed position via an integral hinge from a state shown in FIG. 9. FIG. 11 is a perspective view for explaining a structure before and after the upper mounting member shown in FIG. 9 is engaged with a reinforcement rib.

The side mudguard 10B according to the present embodiment is similar to that of the first embodiment except a configuration of an upper mounting member 3B. Accordingly, the following explanation is made with a focus on the upper mounting member 3B which is different in its configuration, and similar components are indicated with the same referential signs with the first embodiment, and explanation thereof is basically omitted.

As shown in FIG. 9, the upper mounting member 3B includes a seat portion 34B formed along a side surface of the door outer panel 51, an integral hinge 35 coupling an upper end of the seat portion 34B and the upper outer peripheral end 13 of the panel body 1, and a lower end portion 33B extending from a lower end of the seat portion 34B and being in contact with a back surface of the panel body 1. The lower end portion 33B is provided with a plate-shaped locking claw 31 protruding downward. The locking claw 31 has the similar structure with the locking claw 31 in the above mentioned first embodiment.

Therefore, a leading end of the locking claw 31 is inserted in the locking hole 25 of the adjacent reinforcement rib 2 so that the locking claw 31 is engaged with the locking hole 25. As a result, the upper mounting member 3B is fixed to the back surface 12 of the panel body 1 via the locking claw 31 and the integral hinge 35.

Further as shown in FIGS. 10 and 11, the upper mounting member 3B is integrally formed with the panel body 1 so that the upper mounting member 3B is positioned (oriented) in a reversed position via the integral hinge 35 to extend upward from the upper outer peripheral edge 13 of the panel body 1. Since the panel body 1 and the mounting member 3B can be thus integrally formed, material yields can be enhanced and reduction in a die cost can be realized. Moreover, the locking claw 31 can be fitted with the locking hole 25 of the adjacent reinforcement rib 2 only by placing the mounting member 3B in the reversed position after formation, and hence mounting of the panel body 1 with the mounting member 3B can be performed swiftly, improving precision of a mounting position.

Operations and Effects

As explained in detail above, according to a mounting structure of a vehicular resin component (side mudguard) of the present embodiments, the reinforcement rib 2 is designed such that the proximal end portion 21 connected to the panel body 1 has a thin thickness thinner than a thickness of the leading end portion 22, so that sink marks and others are hardly generated on the front surface 11 (design surface) of the panel body 1 and there is no possibility of defects in quality of an outer appearance surface.

The leading end portion 22 is provided, in between the proximal end portion 21, with the inclined surface 23 providing a thickness increasing toward the leading end side and with the locking hole 25 slantingly formed in an inclined direction of the inclined surface. Therefore, in the movable die 6 of a molding die, the negative angle shaping portion 61 for forming the inclined surface 23 of the leading end portion 22 and the locking hole shaping portion 62 for forming the locking hole 25 can be integrally coupled. Accordingly, when the side mudguards 10 and 10B are taken out of the movable die 6 of the molding die, the inclined surface 23 of the leading end portion 22 moves upward along the interior angle shaping portion 61 and the front end portion 22 of the reinforcement rib 2 tilts to separate from the negative angle shaping portion 61, and at the same time, the locking hole 25 is also separated from the locking hole shaping portion 62. Thus, the movable die 6 does not need to be provided with a slide die for a locking hole and others that could result in a complicated die structure, and the locking hole 25 can be formed by a simple die structure. As a result, increase in a die cost can be suppressed.

Further, the mounting members 3 or 3B and 4 are provided with the locking claws 31 and 41 engageable with the corresponding locking holes 25, and the mounting members 3 or 3B and 4 are each fixed to the back surface 12 of the panel body 1 by engaging the locking claw with the locking hole so that the mounting members are bonded to the door panel 5, and thereby the side mudguard 10 or 10B is fixed to the door panel 5 of the vehicle 20 without integrally forming the mounting members 3 or 3B and 4 with the back surface 12 of the panel body 1. Accordingly, there is no possibility of generating sink marks and others on the front surface (design surface) of the panel body 1 in association with the formation of the mounting members 3 or 3B and 4, and the defects in quality of the outer appearance surface can be prevented.

Therefore, a mounting structure of a vehicular resin component formed by a simple die structure can be provided without generating defects such as sink marks on an outer appearance surface of the front surface (design surface) of the side mudguards 10 and 10B which is a vehicular resin component.

Further, according to the present embodiment, in the mounting members 3B and 4, end portions opposite to the locking claws 31 and 41 are connected to the upper outer peripheral edge 13 or the lower outer peripheral edge 14 of the panel body 1 via the integral hinges 35 and 45, and hence the mounting members 3B and 4 placed in the reversed position via the integral hinges 35 and 45 can be formed integrally with the panel body 1 by a simple die structure. Further, the mounting members 3B and 4 are respectively connected with the upper outer peripheral edge 13 and the lower outer peripheral edge 14 of the panel body 1 via the integral hinges 35 and 45, and therefore sink marks and others are hardly generated on the front surface 11 (design surface) of the panel body 1.

Furthermore, the mounting members are connected via the integral hinges 35 and 45, and hence a fitting operation of fitting the locking claws 31 and 41 with the locking holes 25 can be performed swiftly and mounting precision (of the panel body 1) to the door panel 5 can be improved.

Furthermore, according to the present embodiment, the locking claws 31 and 41 are provided on the leading end side with the plate-shaped tab portions 311 and 411, each of which is allowed to pass through the locking hole 25, and on the proximal end side with the claw portions 312 and 412 to be engaged with the locking hole 25. Accordingly, the tips of the locking claws 31 and 41 are inserted in the corresponding locking holes 25 and the plate-shaped tab portions 311 and 411 are pinched to pull the locking claws through the locking holes so that the claw portions 312 and 412 formed on the proximal end side can be engaged with the locking holes 25.

Specifically, the locking claws 31 and 41 are slantingly inserted in the locking holes 25 of the reinforcement rib 2 in the almost same direction with the inclined surface 23, and thereby the plate-shaped tab portions 311 and 411 protrude out from the opposite sides of the locking holes 25. Accordingly, the plate-shaped tab portions 311 and 411 are picked up and raised to a horizontal position and the locking claws 31 and 41 are pulled through the locking holes 25 so that the claw portions 312 and 412 formed on the proximal end side are easily and surely engaged with the locking holes 25.

As a result, even when a direction in which the locking hole 25 is formed and a protruding direction of the locking claws 31 and 41 are different, the fitting operation of fitting the locking claws 31 and 41 with the locking holes 25 can be further swiftly performed by pinching the plate-shaped tab portions 311 and 411 and pulling the locking claws 31 and 41 through the locking holes 25.

The above mentioned embodiments may be modified without departing from the essential characteristics of the present invention. For example, in the above embodiments, the mounting member 4 at the lower outer peripheral edge side of the panel body 1 is fixed to the panel body 1 by the integral hinge 45 and the locking claw 41, but the configuration is not limited to this. For example, the integral hinge 45 may be replaced with another locking claw 41.

INDUSTRIAL APPLICABILITY

The present invention is, for example, utilizable for a mounting structure of an exterior resin component (such as a side mudguard) which is to be mounted to an exterior surface of an automobile.

REFERENCE SIGNS LIST

1 Panel body
2 Reinforcement rib
3, 3B, 4 Mounting member
5 Door panel
6 Movable die
10, 10B Side mudguard (vehicular resin component)
11 Front surface of the panel body
12 Back surface of the panel body
13 Upper outer peripheral edge
14 Lower outer peripheral edge
20 Vehicle
21 Proximal end portion
22 Leading end portion
23 Inclined surface
25 Locking hole
31, 41 Locking claw
32, 42 Adhesive sheet
35, 45 Integral hinge
311, 411 Plate-shaped tab portion
312, 412 Claw portion

The invention claimed is:

1. A mounting structure of a vehicular resin component including: a panel body provided with a front surface having a design surface; a reinforcement rib arranged standing upright on a back surface of the panel body; and a mounting member for a vehicle, wherein the reinforcement rib has a proximal end portion connected to the panel body, the proximal end portion having a thin thickness thinner than a thickness of a leading end portion of the rib, the leading end portion includes an inclined surface formed between the proximal end portion and the leading end portion so that the thickness of the leading end portion increases toward a leading end side, and the leading end portion is provided with a locking hole slantingly formed in an inclined direction of the inclined surface, the mounting member is provided with a locking claw engageable in the locking hole, the locking claw is engaged with the locking hole so that the mounting member is fixed to the back surface of the panel body, and the mounting member is fixed to the vehicle, the locking claw is provided on a tip side with a plate-shaped tab portion insertable through the locking hole and provided on a proximal end side with a claw portion engageable with the locking hole, and the plate-shaped tab portion is configured to be curved to be brought into contact with a back surface of the panel body and the curved plate-shaped tab portion prevents disengagement of the claw portion from the locking hole.

2. The mounting structure of the vehicular resin component according to claim 1, wherein the mounting member has an end portion opposite the locking claw, the end portion being connected to an outer peripheral edge of the panel body with an integral hinge.

* * * * *